United States Patent [19]

Fu et al.

[11] Patent Number: 5,056,110
[45] Date of Patent: Oct. 8, 1991

[54] DIFFERENTIAL BUS WITH SPECIFIED DEFAULT VALUE

[75] Inventors: Timonty S. Fu, Fremont; Allen W. Roberts, Union City, both of Calif.

[73] Assignee: MIPS Computer Systems, Inc., Sunnyvale, Calif.

[21] Appl. No.: 448,715

[22] Filed: Dec. 11, 1989

[51] Int. Cl.⁵ ............................................... H04B 3/56
[52] U.S. Cl. ........................................ 375/36; 307/443
[58] Field of Search ................... 375/36, 76; 330/261, 330/279, 123; 307/443; 370/27

[56] References Cited

U.S. PATENT DOCUMENTS 4,083,010 4/1978 Looschen ............................. 375/36
4,573,168 2/1986 Henze et al. ......................... 375/36

Primary Examiner—Benedict V. Safourek
Assistant Examiner—Tesfaldet Bocure
Attorney, Agent, or Firm—Townsend and Townsend

[57] ABSTRACT

A solution to the problem in differential buses that the bus state for a given line pair is undefined when no unit is driving either of the bus lines in the pair. The lines in the bus pair are terminated to different voltage levels, thereby establishing a desired default condition when no unit is driving either line. The voltage offset between the two bus lines must be sufficient that differential receivers coupled to the bus when the bus is not driven can respond to the offset. At the same time, the offset must not be so great that a driver attempting to drive the bus pair cannot overcome the offset with enough margin for the receivers.

7 Claims, 2 Drawing Sheets

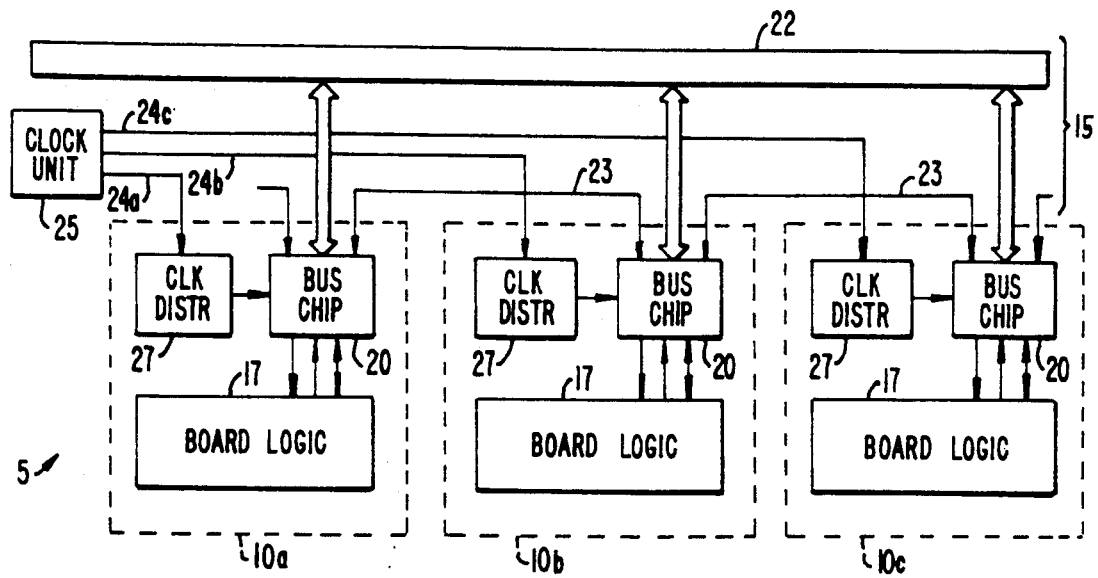
FIG._1A.
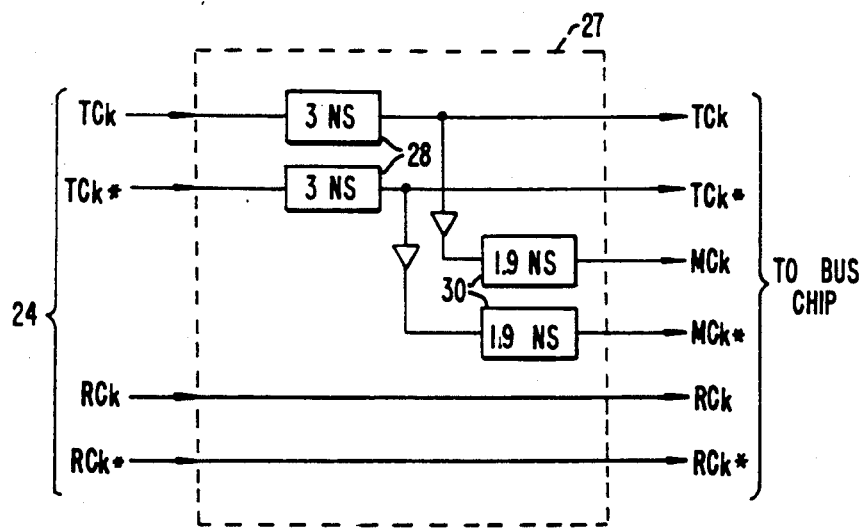
FIG._1B.

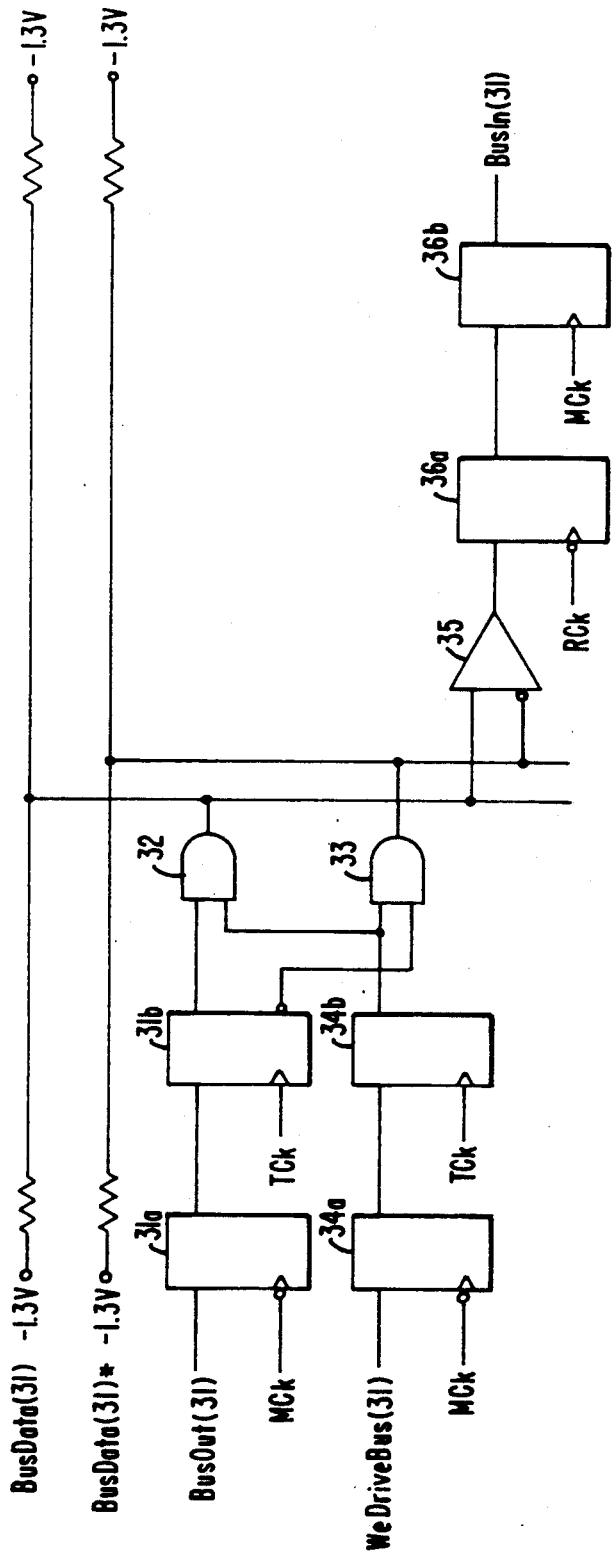
FIG.__IC.
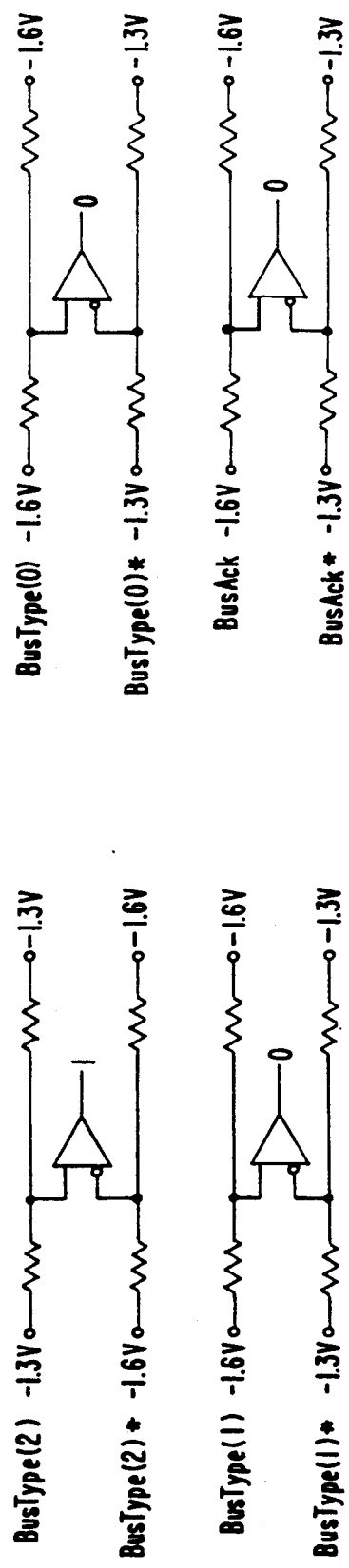
FIG.__ID.

DIFFERENTIAL BUS WITH SPECIFIED DEFAULT VALUE

BACKGROUND OF THE INVENTION

The present invention relates generally to bus communications, and more specifically to termination of a differential bus.

A typical differential bus is implemented as a line pair (true and complement) to represent a single logical variable. A differential receiver coupled to the line pair provides a logical 1 or logical 0 output depending on which of the lines has a signal driven on it.

In an exemplary bus system, the lines in the differential pair are terminated at −1.3 volts. A transmitting unit drives a logical 1 or 0 by driving a 0.7 volt signal on either the true or complement line, and doesn't drive the other. A receiving unit will respond to a voltage differential of as little as 0.15–0.20 volts.

SUMMARY OF THE INVENTION

The present invention addresses the problem in differential buses that the bus state for a given line pair is undefined when no unit is driving either of the bus lines in the pair.

In brief, the present invention contemplates terminating the lines in the bus pair to different voltage levels, thereby establishing a desired default condition when no unit is driving either line. The voltage offset between the two bus lines must be sufficient that differential receivers coupled to the bus when the bus is not driven can respond to the offset. At the same time, the offset must not be so great that a driver attempting to drive the bus pair cannot overcome the offset with enough margin for the receivers.

In an exemplary bus system, where the lines are normally terminated at −1.3 volts, and a unit drives to a 1 or 0 level by driving a 0.7 volt signal on either the true or complement line, a default value is established by terminating one of the lines at −1.6 volts. To establish a logical 1 as the default, the complement line is terminated at −1.6 volts; to establish a logical 0 as the default of 0, the true line is terminated at −1.6 volts. The 0.3-volt offset is sufficient to be sensed by the receiver, which requires a differential of 0.15–0.2 volts. At the same time, when a unit drives the line that is terminated at −1.6 volts, the 0.7-volt drive signal overcomes the 0.3-volt offseet.

A further understanding of the nature and advantages of the present invention may be realized by reference to the remaining portions of the specification and the accompanying drawings.

BRIEF DESCRIPTION OF THE DRAWINGS

FIG. 1A is a high level block diagram of a computer system utilizing the bus termination mechanism of the present invention;

FIG. 1B is a block diagram showing the clock distribution to the bus chip;

FIG. 1C is a block diagram showing the bus drivers and receivers in the bus chip; and FIG. 1D shows the special termination scheme for establishing default values on selected bus lines.

DESCRIPTION OF A REPRESENTATIVE EMBODIMENT

FIG. 1A is an overall block diagram illustrating a computer system 5 in which a plurality of functional units 10 communicate with each other over a system bus 15. In a representative embodiment, there may be up to fifteen such units, implemented on circuit board connected to a backplane having traces defining the bus. Each functional unit includes a portion, referred to as board logic 17, which may be regarded as the functional unit proper. A bus interface portion, implemented as a single ECL VLSI chip, referred to as bus chip 20, interfaces the board logic to the bus. In the particular embodiment described herein, all bus control and data paths for any functional unit which connects to the bus are contained in bus chip 20.

For illustrative purposes, a system having three such units, designated 10a, 10b, and 10c will be described. In a typical system, at least one of the functional units is a CPU, at least one is an I/0 processor, and at least one is a memory controller with associated memory.

System bus 15 includes a set of bi-directional differential signal lines 22, distributed in parallel to all the functional units, including:

| | |
|---|---|
| BusData(31..0) | - system data bus |
| BusPar | - support odd parity over BusData |
| BusType(2..0) | - identifier tag for BusData |
| BusAck | - provide acknowledgment mechanism |

Table 1 shows the encoding for BusType.

In addition, the backplane includes a set of traces 23, which connect the units in a daisy chain manner for slot determination, and sets 24a–c of clock lines, radially distributed to units 10a–c from a clock unit 25. Lines 24 communicate to a clock distribution network 27 on each unit.

FIG. 1B is a block diagram of clock distribution network 27. Clock lines 24 include signals designated TCk and RCk (and their logical complements TCk* and RCk*), which are distributed with constant delay traces on the backplane to all units. TCk and RCk are 12.5-ns, 50% duty cycle clocks. RCk is delayed relative to TCk by 5 ns at the point where they arrive at clock distribution network 27. RCk and RCk* are communicated to bus chip 20 without further delay. TCk and TCk* are delayed by 3-ns delay lines 28 before reaching bus chip 20. The delayed versions of TCk and TCk* are also buffered and delayed by 1.9-ns delay lines 30 to define a complementary pair of signals MCk and MCk*. The maximum skew between different TCk and RCk signals (at the bus chip) is ±0.5 ns.

The delay of RCk relative to TCk allows the data on the bus to be partially overlapped, i.e., to take more than a 12.5-ns cycle to propagate from driver to receiver. All bus drivers use TCk to clock output signals and all bus receivers use RCk to clock the input registers for data from the bus.

FIG. 1C is a block diagram showing the circuitry for driving and receiving signals on one of signal lines 22, say BusData(31). The bus is a differential bus and includes a complementary line pair, in this case, BusData(31) and BusData(31)*. With two exceptions set forth below, the bus lines in each pair are terminated at −1.3 volts.

An internal signal WeDriveBus(31) specifies that bus pair no. 31 will be driven with the value defined by another internal signal BusOut(31). BusOut(31) drives a first master-slave flip-flop defined by latches 31a and 31b, the complementary outputs of which are communicated to respective first inputs of AND gates 32 and 33.

WeDriveBus(31) drives a second master-slave flip-flop defined by latches 34a and 34b, the output of which drives both second inputs of the AND gates 32 and 33. The outputs of AND gates 32 and 33, which are guaranteed to be complementary, are coupled to BusData(31) and BusData(31)*. A true value at one of the AND gate outputs drives a signal of about 0.7 volts on the line to which is connected, while a false value results in no drive. Latches 31a and 34a are clocked by the falling edge of MCk while latches 31b and 34b are clocked by the rising edge of TCk. Each latch is characterized in that it holds the value when its clock input is low, and becomes transparent when its clock input is high.

Signals in from the bus are communicated to the respective inputs of a differential receiver 35 and to a master slave flip-flop defined by latches 36a and 36b. Latch 36a is clocked by the falling edge of RCk and latch 36b is clocked by the rising edge of MCk. The output of latch 36b is a signal BusIn(31) that is communicated to other portions of the bus chip.

FIG. 1D shows a special termination scheme for certain of the bus line pairs, namely those for BusType(2..0) and BusAck. As noted above, most of the bus pairs have both lines terminated at −1.3 volts, so that when no unit drives them, the bus value is undefined.

However, it is important that the pairs for BusType(2..0) and BusAck provide a defined value, even if no unit drives them. To provide default values, one line in each pair is terminated at −1.6 volts. More particularly, BusType(2)*, BusType(1), BusType(0), and BusAck are terminated at −1.6 volts, so that BusType and BusAck assume default values of 100 and 0, respectively.

The difference in termination voltages to establish the default value must satisfy two requirements. First, the voltage difference must be such as to exceed the receiver's requirement when no unit is driving the bus. Second, the difference must be small enough (in absolute terms) such that when a unit drives a positive signal on the line terminated at the lower voltage, the resultant voltage exceeds the normally terminated line by an amount that is sufficient for the receiver. In the particular example where the receiver requires about 0.15–0.2 volts and the driver drives 0.7 volts, the difference between the termination voltages must be greater than 0.15–0.2 volts and must be less than about 0.5–0.55 volts. A difference of 0.3 volts clearly meets these constraints.

In conclusion, it can be seen that the present invention provides a simple and effective way of establishing a default value on a differential bus when no unit is driving the bus. While the above is a complete description of the preferred embodiments of the invention, various alternatives, modifications, and equivalents may be used. Therefore, the above description should not be taken as limiting the scope of the invention which is defined by the appended claims.

TABLE 1

| | BusType Encoding Interpretation | |
|---|---|---|
| BusType(2..0) | Master to Slave | to Master |
| 000 | NoData | NoData |
| 001 | Command | SlvErr1 |
| 010 | Data | Data |
| 011 | Data + Switch | Data + Switch |
| 100 | BadData | SlvErr2 |
| 101 | Command | SlvErr3 |
| 110 | Data + WriteDisabled | Data |
| 111 | Data + WriteDisabled + Switch | Data + Switch |

What is claimed is:

1. A differential bus for use in a system with a number of bus units wherein at least one bus unit includes a driver and at least one unit includes a receiver, each driver having first and second output terminals and operating in response to input signals specifying that the driver is to provide a signal of at least a first predetermined voltage increment on one or the other but not both of the output terminals, each receiver having first and second input terminals and operating in response to a voltage differential at its input terminals of at least a second predetermined lesser voltage increment to indicate a signal value depending on the sense of the voltage differential, the differential bus comprising:

means defining a first signal line adapted to be coupled to respective first output terminals of the drivers and first input terminals of the receivers;

means defining a second signal line adapted to be coupled to respective second output terminals of the drivers and second input terminals of the receivers; and means for terminating said first and second signal lines at respective first and second voltage levers, said first and second voltage levels being offset with respect to each other by an amount that is at least as great as the second predetermined voltage increment and is no greater than the difference between the first and second predetermined voltage increments;

whereupon a receiver having its input terminals coupled to said signal lines detects a defined default value that depends on which of said signal lines is terminated at the higher voltage level when no driver is driving either of said signal lines.

2. The differential bus of claim 1 wherein the first predetermined voltage increment is about 0.7 volts, the second predetermined voltage increment is about 0.15–0.20 volts, and the voltage offset between said first and second voltage levels is about 0.3 volts.

3. A method of providing a differential bus having a number of bus pairs, each of which includes first and second lines to which a number of bus units can be coupled, at least one bus unit having a differential driver and at least one bus unit having a differential receiver, wherein a selected bus pair assumes a default value in the absence of any bus unit driving that bus pair, comprising the steps of:

terminating the first line in the bus pair at a given voltage level;

terminating the second line in the bus pair at a second voltage level, offset from the first voltage level by an amount that is large enough in absolute value to establish a defined output at a differential receive coupled to the bus pair when no driver coupled to the bus pair is driving the bus pair, and small enough in absolute value to allow a drive coupled to the bus pair to drive the bus pair with either polarity and establish the corresponding defined output at a differential receiver coupled to the bus pair.

4. A differential bus system comprising;
means defining a bus pair having first and second signal lines;
a driver coupled to said signal lines and operating in response to an input signal specifying that the driver is to provide a signal of at least a first predetermined voltage increment on one or the other but not both of said signal lines;
a differential receive, coupled to said signal lines and operating in response to a voltage differential between said signal lines of at least a second predetermined lesser voltage increment to indicate a value on but pair, which value depends on the sense of the voltage differential; and
means for terminating said first and second signal lines at respective first and second voltage levels;
said first and second voltage levels being offset with respect to each other by an amount that is at least as great as said second predetermined voltage increment and is no greater than the difference between said first and second predetermined voltage increments;
whereupon said receiver detects a defined default value, which default value depends on which of said signal lines is terminated at the higher voltage level, when no driver is driving either of said signal lines.

5. The differential bus system of claim 4 wherein said first predetermined voltage increment is about 0.7 volts, said second predetermined voltage increment is about 0.15–0.20 volts, and said amount of voltage offset between said first and second voltage levels is about 0.3 volts.

6. The differential bus system of claim 4, and further comprising:
means defining an additional bus pair having third and fourth signal lines; and
means for terminating said third and fourth signal lines at the same voltage level;
whereupon the state of said second bus pair is undefined when no differential driver is driving either of said third and fourth signal lines.

7. The differential bus of claim 1, and further comprising:
means defining third and fourth signal lines; and
means for terminating said third and fourth signal lines at the same voltage level;
whereupon a receiver coupled to said third and fourth signal lines does not detect a defined value when no differential driver is driving either of said third and fourth signal lines.

* * * * *